(12) United States Patent
Karcher et al.

(10) Patent No.: US 8,672,028 B2
(45) Date of Patent: Mar. 18, 2014

(54) SETTABLE COMPOSITIONS COMPRISING INTERGROUND PERLITE AND HYDRAULIC CEMENT

(75) Inventors: Jeffery D. Karcher, Duncan, OK (US); D. Chad Brenneis, Marlow, OK (US); Craig W. Roddy, Duncan, OK (US); James R. Benkley, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 379 days.

(21) Appl. No.: 13/180,238

(22) Filed: Jul. 11, 2011

(65) Prior Publication Data

US 2012/0152539 A1    Jun. 21, 2012

Related U.S. Application Data

(63) Continuation-in-part of application No. 12/975,196, filed on Dec. 21, 2010, now Pat. No. 8,403,045.

(51) Int. Cl.
*E21B 33/13* (2006.01)
*E21B 33/14* (2006.01)
*C04B 28/02* (2006.01)
*C04B 28/04* (2006.01)
*C09K 8/46* (2006.01)

(52) U.S. Cl.
USPC ........... 166/277; 106/698; 106/713; 106/716; 106/751; 106/819; 166/292; 166/293; 166/300; 507/269

(58) Field of Classification Search
None
See application file for complete search history.

(56) References Cited

U.S. PATENT DOCUMENTS

| | | |
|---|---|---|
| 2,021,956 A | 11/1935 | Gladney et al. |
| 2,045,899 A | 6/1936 | Davis |
| 2,094,316 A | 9/1937 | Cross et al. |
| 2,133,622 A | 10/1938 | Larmour et al. |
| 2,193,775 A | 3/1940 | Stratford |
| 2,193,807 A | 3/1940 | Dieterich |
| 2,329,940 A | 9/1943 | Ponzer |
| 2,772,739 A | 12/1956 | Arie |
| 2,842,205 A | 7/1958 | Allen et al. |
| 2,848,051 A | 8/1958 | Willaims |
| 2,871,133 A | 1/1959 | Palonen et al. |
| 2,880,096 A | 3/1959 | Hurley |
| 2,945,769 A | 7/1960 | Gama et al. |
| 3,066,031 A | 11/1962 | Schifferle |
| 3,168,139 A | 2/1965 | Kennedy et al. |
| 3,320,077 A | 5/1967 | Prior |
| 3,411,580 A | 11/1968 | Roberts et al. |
| 3,421,703 A | 1/1969 | Galer |
| 3,454,095 A | 7/1969 | Messenger et al. |
| 3,467,193 A | 9/1969 | Messenger |
| 3,473,939 A | 10/1969 | Mayberry et al. |
| 3,499,491 A | 3/1970 | Wyant et al. |
| 3,557,876 A | 1/1971 | Tragesser |
| 3,574,816 A | 4/1971 | Abbdellatif et al. |
| 3,628,973 A * | 12/1971 | Greening et al. ............. 106/734 |
| 3,748,159 A | 7/1973 | George |
| 3,749,173 A | 7/1973 | Hill et al. |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky |
| 3,959,007 A | 5/1976 | Pitt |
| 4,018,617 A | 4/1977 | Nicholson |
| 4,018,619 A | 4/1977 | Webster et al. |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,176,720 A | 12/1979 | Wilson |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A | 3/1984 | Burdick et al. |
| 4,460,292 A | 7/1984 | Durham et al. |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

USPTO Office Action for U.S. Appl. No. 13/431,701 dated Nov. 9, 2012.

(Continued)

*Primary Examiner* — George Suchfield
(74) *Attorney, Agent, or Firm* — Craig W. Roddy; Tumey L.L.P.

(57) ABSTRACT

Methods and compositions are disclosed that comprise interground perlite and hydraulic cement. An embodiment provides a method of cementing comprising: providing a settable composition comprising perlite, hydraulic cement, and water, wherein the perlite and hydraulic cement are interground prior to combination with the water to form the settable composition; and allowing the settable composition to set.

27 Claims, No Drawings

(56) References Cited

U.S. PATENT DOCUMENTS

| | | |
|---|---|---|
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,641,658 B1 * | 11/2003 | Dubey .................... 106/705 |
| 6,645,289 B2 | 11/2003 | Sobolev |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |

(56) References Cited

U.S. PATENT DOCUMENTS

| | | | |
|---|---|---|---|
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,869,474 B2 | 3/2005 | Perez-Pena et al. |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,285,164 B2 | 10/2007 | Luke et al. |
| 7,303,015 B2 | 12/2007 | Fyten et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,612,021 B2 | 11/2009 | Chatterji |
| 7,627,870 B1 | 12/2009 | Michaeli et al. |
| 7,631,692 B2 | 12/2009 | Roddy et al. |
| 7,655,088 B2 | 2/2010 | Bethani |
| 7,674,332 B2 | 3/2010 | Roddy et al. |
| 7,741,841 B2 | 6/2010 | Edwards et al. |
| 7,743,828 B2 | 6/2010 | Roddy et al. |
| 7,748,453 B2 | 7/2010 | Reddy |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,867,954 B2 | 1/2011 | Warrender et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,029,618 B2 | 10/2011 | Al-Shafei |
| 8,039,253 B2 | 10/2011 | Asou |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,327,939 B2 | 12/2012 | Roddy |
| 8,333,240 B2 | 12/2012 | Roddy |
| 8,399,387 B2 | 3/2013 | Roddy |
| 8,403,045 B2 * | 3/2013 | Brenneis et al. ............ 166/277 |
| 8,434,553 B2 | 5/2013 | Brenneis et al. |
| 8,440,596 B2 | 5/2013 | Brenneis et al. |
| 8,486,868 B2 * | 7/2013 | Brenneis et al. ............ 507/219 |
| 8,486,869 B2 | 7/2013 | Brenneis et al. |
| 8,522,873 B2 | 9/2013 | Benkley et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2003/0188669 A1 * | 10/2003 | Sobolev et al. ............ 106/737 |
| 2004/0007162 A1 | 1/2004 | Morioka et al. |
| 2004/0040474 A1 * | 3/2004 | Perez-Pena et al. ......... 106/808 |
| 2004/0040475 A1 | 3/2004 | De La Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0182577 A1 | 9/2004 | Chatterji et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterj et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2005/0205255 A1 | 9/2005 | Gagliano et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0086499 A1 | 4/2006 | Badalamenti et al. |
| 2006/0166834 A1 | 7/2006 | Roddy |
| 2006/0175060 A1 | 8/2006 | Reddy |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0089643 A1 | 4/2007 | Roddy et al. |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2008/0236814 A1 | 10/2008 | Roddy |
| 2008/0300149 A1 | 12/2008 | Reddy et al. |
| 2009/0044726 A1 | 2/2009 | Brouillette et al. |
| 2009/0105099 A1 | 4/2009 | Warrender et al. |
| 2009/0120644 A1 | 5/2009 | Roddy et al. |
| 2009/0124522 A1 | 5/2009 | Roddy et al. |
| 2009/0145601 A1 | 6/2009 | Bailey |
| 2009/0266543 A1 | 10/2009 | Reddy et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0051266 A1 | 3/2010 | Roddy et al. |
| 2010/0051275 A1 | 3/2010 | Lewis et al. |
| 2010/0077922 A1 | 4/2010 | Constantz et al. |
| 2010/0081584 A1 | 4/2010 | Perez |
| 2010/0196104 A1 | 8/2010 | Constantz et al. |
| 2010/0258035 A1 | 10/2010 | Constantz et al. |
| 2010/0258312 A1 | 10/2010 | Brenneis et al. |
| 2010/0273912 A1 | 10/2010 | Roddy et al. |

(56) References Cited

U.S. PATENT DOCUMENTS

| | | |
|---|---|---|
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2010/0313793 A1 | 12/2010 | Constantz et al. |
| 2011/0000400 A1 | 1/2011 | Roddy |
| 2011/0017452 A1 | 1/2011 | Benkley et al. |
| 2011/0100626 A1 | 5/2011 | Brenneis et al. |
| 2011/0297378 A1 | 12/2011 | Reddy et al. |
| 2012/0145393 A1 | 6/2012 | Roddy |
| 2012/0152539 A1 | 6/2012 | Karcher et al. |
| 2012/0227631 A1 | 9/2012 | Roddy |
| 2012/0234541 A1 | 9/2012 | Roddy |
| 2012/0267107 A1 | 10/2012 | Benkley et al. |
| 2012/0285682 A1 | 11/2012 | Santra et al. |
| 2012/0291674 A1 | 11/2012 | Brenneis et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |
| 2013/0008352 A1 | 1/2013 | Roddy et al. |
| 2013/0048286 A1 | 2/2013 | Morgan et al. |
| 2013/0061779 A1 | 3/2013 | Brenneis et al. |
| 2013/0112405 A1 | 5/2013 | Chatterji et al. |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0213642 A1 | 8/2013 | Chatterji et al. |
| 2013/0213643 A1 | 8/2013 | Chatterji et al. |
| 2013/0233538 A1 | 9/2013 | Chatterjie et al. |
| 2013/0244911 A1 | 9/2013 | Benkley et al. |

FOREIGN PATENT DOCUMENTS

| | | |
|---|---|---|
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 A1 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 9/1982 |
| WO | 93/21122 | 10/1993 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | 2006/074946 | 6/2009 |
| WO | 2009/071962 | 11/2009 |
| WO | WO 2009/138747 | 11/2009 |
| WO | 2012/001343 | 1/2012 |

OTHER PUBLICATIONS

USPTO Office Action for U.S. Appl. No. 13/620,163 dated Nov. 9, 2012.
International Search Report and Written Opinion for International Application No. PCT/US2012/046117 dated Oct. 26, 2012.
USPTO Office Action for U.S. Appl. No. 13/669,149 dated Dec. 19, 2012.
USPTO Office Action for U.S. Appl. No. 13/606,098 dated Dec. 13, 2012.
HES Brochure "Micro Matrix® Cement" dated Nov. 2006.
HES Brochure "VersaCem™ Cement" dated Jan. 2007.
HES Brochure "FineCem™ Cement" dated Jul. 2010.
Office Action from U.S. Appl. No. 13/560,406 dated Oct. 17, 2012.
International Search Report for PCT/GB2011/001749 dated Apr. 5, 2012.
International Search Report and Written Opinion for PCT/GB2010/000712 dated Jul. 26, 2010.
Office Action for U.S. Appl. No. 13/620,013 dated Feb. 26, 2013.
PCT International Search Report and Written Opinion for International Application No. PCT/GB2011/000933 dated Sep. 22, 2011.
PCT International Search Report and Written Opinion for International Application No. PCT/GB2011/001411 dated Jan. 27, 2012.
USPTO Office Action for U.S. Appl. No. 12/264,010 dated Oct. 31, 2011.
U.S. Appl. No. 13/872,063 (Chatterji et al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) mailed May 13, 2013.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.) filed Mar. 27, 2013.
U.S. Appl. No. 13/725,833 (Chatterji et al.) filed Dec. 21, 2012.
Office Action for U.S. Appl. No. 13/725,833 (Chatterji et al.) dated Apr. 10, 2013.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures" 1999.
"Kiln Dusts", Apr. 14, 2005.
Sersale, Portland-Zeolite-Cement for Minimizing Alkali-Aggregate Expansion, 1987.
"Standards for the Management of Cement Kiln Dust Waste", Apr. 14, 2005.
Naiqian, "Study on the Suppression Effect of Natural Zeolite on Expansion of Concrete Due to Alkali-Aggegate Reaction", 1998.
Janotka, "The Properties of Mortar Using Blends With Portland Cement Clinker, Zeolite Tuff and Gympsum", 1995.
Herndon, "Setting Downhole Plugs: A State-of-the-Art, Petroleum Engineer International", Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonization of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.

(56) References Cited

OTHER PUBLICATIONS

Atkins, "Zeolite P in Cements", "Its Potential for Immobolizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement and Pozmix 140" (undated but admitted as prior art).
HES Brochure "SCR-100 Cement Retarder A Valuable Time Server", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information" 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™", Aug. 2006.
LaFarge MSDS "Cement Kiln Dust", Mar. 3, 2005.
LaFarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al,, World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
English language translation of Foreign Office Action for Application No. RU2008113765, Jul. 6, 2009.
Foreign Office Action for Canadian Patent Application No. 2621835, Oct. 2, 2009.
Foreign Office Action for Canadian Patent Application No. 2621832, Oct. 5, 2009.
PCT International Search Report and Written Opinion for International Application No. PCT/GB2009/002598, Feb. 11, 2010.
PCT International Search Report and Written Opinion for International Application No. PCT/GB2009/002597, Feb. 1, 2010.
English language translation of USSR Patent No. RU 2026959, Jan. 20, 1995.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.
Foreign Office Action for EP Application No. 06 779 194.7, Jul. 2, 2010.
HES Brochure "Enhancer 923™ Cement Agent", 2010.
HES Brochure "Enhancer 923™ Agent—Successes from the Field", 2010.
PCT International Preliminary Report on Patentability (Chapter 1) for International Application No. PCT/GB2009/002018, Mar. 24, 2011.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
English language translation of Foreign Office Action for Chinese Application No. 200680042014.3, Dec. 1, 2010.
Office Action from U.S. Appl. No. 12/844,612, Jan. 28, 2011.
Foreign Office Action for Canadian Application No. 2658155, Nov. 16, 2010.
Foreign Office Action for Canadian Application No. 2650630, Oct. 14, 2010.
Foreign Office Action for EP Application No. 09 713 469.6, Sep. 28, 2010.
PCT International Search Report and Written Opinion for International Application No. PCT/GB2009/000295, Jul. 30, 2009.
PCT International Preliminary Report on Patentability for International Application No. PCT/GB2009/000295, Aug. 24, 2010.
Office Action for U.S. Appl. No. 12/844,612, Oct. 1, 2010.
Foreign Office Action for EP Application No. 06 779 191.3, Mar. 31, 2010.
Foreign Office Action for CN Application No. 200680042004.X, May 12, 2010.
Foreign Office Action for RU Application No. 2008113766, Jul. 14, 2009.

(56) References Cited

OTHER PUBLICATIONS

Foreign Office Action for RU Application No. 2008113766, Apr. 8, 2010.
Foreign Office Action for EP Application No. 06 794 646.7, Sep. 24, 2010.
Office Action for U.S. Appl. No. 12/558,097, Sep. 3, 2010.
Foreign Office Action for EP Application No. 06 779 199.6, Mar. 1, 2010.
Notice of Allowance from U.S. Appl. No. 13/399,913 dated Aug. 23, 2012.
Notice of Allowance from U.S. Appl. No. 13/535,258 dated Sep. 7, 2012.
Notice of Allowance from U.S. Appl. No. 12/825,004 dated Sep. 20, 2012.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Sep. 19, 2012.
U.S. Appl. No. 13/620,163, filed Sep. 14, 2012.
U.S. Appl. No. 13/620,013, filed Sep. 14, 2012.
U.S. Appl. No. 13/662,111, filed Oct. 26, 2012.
U.S. Appl. No. 13/669,149, filed Nov. 5, 2012.
USPTO Office Action for U.S. Appl. No. 12/844,612 dated Dec. 23, 2011.
USPTO Notice of Allowance for U.S. Appl. No. 12/544,915 dated Aug. 1, 2011.
Adaska and Taubert, "Beneficial Uses of Cement Kiln Dust", 2008 IEEE/PCA 50th Cement Industry Technical Conference, Miami, FL, May 19-22, 2008, pp. 1-19.
Office Action from U.S. Appl. No. 12/825,004 dated Jun. 14, 2012.
Notice of Allowance from U.S. Appl. No. 13/447,560 dated Jun. 21, 2012.
Office Action from U.S. Appl. No. 13/479,476 dated Jul. 2, 2012.
Office Action from U.S. Appl. No. 12/975,196 dated Jul. 3, 2012.
Final Office Action from U.S. Appl. No. 12/844,612 dated Jul. 30, 2012.
Final Office Action from U.S. Appl. No. 12/264,010 dated Apr. 10, 2012.
Office Action from U.S. Appl. No. 12/844,612 dated Apr. 11, 2012.
Office Action from U.S. Appl. No. 13/399,913 dated May 15, 2012.
Office Action from U.S. Appl. No. 13/447,560 dated May 31, 2012.
Office Action from U.S. Appl. No. 12/821,412 dated Jun. 5, 2012.
Foreign Office Action for Canadian Application No. 2736148 dated May 29, 2012.
Final Office Action from USPTO for U.S. Appl. No. 13/477,777 dated May 29, 2013.
Office Action from USPTO for U.S. Appl. No. 13/620,013 dated May 28, 2013.
Notice of Allowance from USPTO for U.S. Appl. No. 13/560,406 dated May 29, 2013.
Notice of Allowance from USPTO for U.S. Appl. No. 12/895,436 dated May 28, 2013.
Notice of Allowance from USPTO for U.S. Appl. No. 13/535,145 dated May 24, 2013.
Office Action from USPTO for U.S. Appl. No. 13/851,925 dated Jun. 6, 2013.
Office Action from USPTO for U.S. Appl. No. 13/851,391 dated Jul. 3, 2013.
Office Action from USPTO for U.S. Appl. No. 13/889,398 dated Jun. 20, 2013.
Office Action from USPTO for U.S. Appl. No. 13/872,063 dated Jul. 12, 2013.
Office Action from USPTO for U.S. Appl. No. 13/767,710 dated Jul. 19, 2013.
Notice of Allowance from USPTO for U.S. Appl. No. 13/851,391 dated Jul. 31, 2013.
Notice of Allowance from USPTO for U.S. Appl. No. 13/889,398 dated Aug. 20, 2013.
Notice of Allowance for U.S. Appl. No. 13/662,111 dated Oct. 21, 2013.
Office Action for U.S. Appl. No. 13/620,013 dated Oct. 2, 2013.
Office Action for U.S. Appl. No. 13/851,925 dated Sep. 20, 2013.
Office Action for U.S. Appl. No. 13/767,710 dated Sep. 20, 2013.
International Search Report and Written Opinion for PCT/US2013/048092.
Office Action for U.S. Appl. No. 13/477,777 dated Sep. 20, 2013.
International Search Report and Written Opinion for PCT/US2013/056719 dated Oct. 25, 2013.

* cited by examiner

SETTABLE COMPOSITIONS COMPRISING INTERGROUND PERLITE AND HYDRAULIC CEMENT

CROSS-REFERENCE TO RELATED APPLICATIONS

This application is a continuation-in-part of co-pending U.S. patent application Ser. No. 12/975,196, entitled "Settable Compositions Comprising Unexpanded Perlite and Methods of Cementing in Subterranean Formations," filed on Dec. 21, 2010, the entire disclosure of which is incorporated herein by reference.

BACKGROUND

The present invention relates to cementing operations and, more particularly, in certain embodiments, to methods and compositions that comprise interground perlite and hydraulic cement.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, settable compositions are commonly utilized. As used herein, the term "settable composition" refers to a composition(s) that hydraulically sets or otherwise develops compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a cement sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like.

The hydration of the cement in these cementing methods is a complex process because several phases may take part in the reaction simultaneously. In order to control the reaction processes to render the compositions suitable for well cementing, various additives such as retarders, strength enhancers, and accelerators may be added. However, the operating conditions for wells are becoming more challenging and demanding, and the search for new materials continues to meet these challenges. For instance, cement slurries used in well cementing often encounter problems of gaining sufficient strength in a reasonable amount of time for well operations to continue. The costs associated with wait-on-cement ("WOC") play an important role in well cementing.

SUMMARY

The present invention relates to cementing operations and, more particularly, in certain embodiments, to methods and compositions that comprise interground perlite and hydraulic cement.

An embodiment provides a method of cementing comprising: providing a settable composition comprising perlite, hydraulic cement, and water, wherein the perlite and hydraulic cement are interground prior to combination with the water to form the settable composition; and allowing the settable composition to set.

Another embodiment provides a method of cementing comprising: providing a settable composition comprising unexpanded perlite, hydraulic cement, and water, wherein the unexpanded perlite and hydraulic cement are interground prior to combination with the water to form the settable composition; introducing the settable composition into a well bore; and allowing the settable composition to set.

Yet another embodiment provides a composition comprising interground perlite and hydraulic cement.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the settable compositions of the present invention may comprise perlite. Perlite suitable for use in embodiments of the present invention includes expanded perlite and unexpanded perlite. In some embodiments, the settable composition may comprise perlite interground with a hydraulic cement. In some embodiments, the settable compositions may comprise unexpanded perlite with cement kiln dust ("CKD"), pumicite, or a combination thereof. There may be several potential advantages to the methods and compositions of the present invention, only some of which may be alluded to herein. One of the many potential advantages of embodiments of the present invention is that the inclusion of the unexpanded perlite in embodiments of the settable composition may increase the compressive strength of the settable composition after setting. Another potential advantage of embodiments of the present invention is that the CKD, unexpanded perlite, pumicite, or a combination thereof may be used to reduce the amount of a higher cost component, such as Portland cement, resulting in a more economical settable composition. Yet another potential advantage of embodiments of the present invention is that reduction of the amount of Portland cement can reduce the carbon footprint of the cementing operation.

Perlite is an ore and generally refers to a naturally occurring volcanic, amorphous siliceous rock comprising mostly silicon dioxide and aluminum oxide. A characteristic of perlite is that it may expand to form a cellular, high-porosity particle or hollow sphere containing multi-cellular cores when exposed to high temperatures due to the sudden vaporization of water within the perlite. The expanded perlite may be used as a density-reducing additive for making lightweight settable compositions. Perlite suitable for use in embodiments of the present invention includes expanded perlite and unexpanded perlite. In some embodiments, the perlite may comprise unexpanded perlite.

It has recently been discovered the addition of unexpanded perlite to settable compositions comprising CKD and/or pumicite may provide unexpected increases in compressive strengths. In accordance with embodiments of the present invention, the unexpanded perlite may be used to increase the compressive strength of settable compositions comprising CKD and/or pumicite. In addition, unexpanded perlite can increase the compressive strength of settable compositions comprising Portland cement. It is believed that the unexpanded perlite may be particularly suited for use at elevated well bore temperatures in accordance with embodiments of the present invention, such as at temperatures greater than about 80° F., alternatively greater than about 120° F., and alternatively greater than about 140° F.

In one embodiment, unexpanded perlite may be used, among other things, to replace higher cost cementitious components, such as Portland cement, resulting in more economical settable compositions. In addition, substitution of the Portland cement for the unexpanded perlite should result in a settable composition with a reduced carbon footprint.

In present embodiments, the perlite can be ground to any size suitable for use in cementing operations. In an embodiment, the perlite is ground to a mean particle size of about 1 micron to about 400 microns, alternatively, about 1 micron to about 100 microns and, alternatively, about 1 micron to about 25 microns. The mean particle size corresponds to d50 values as measured by commercially available particle size analyzers such as those manufactured by Malvern Instruments, Worcestershire, United Kingdom. In another embodiment, the perlite has a particle size distribution of about 1 micron to about 1,000 microns with a mean particle size of about 1 micron to about 100 microns. The particle size distribution corresponds to the maximum and minimum sizes allowed in the distribution. An example of a suitable ground perlite that is unexpanded is available from Hess Pumice Products, Inc., Malad City, Id., under the tradename IM-325 with a mesh size of 325.

The perlite may be included in the settable compositions in an amount sufficient to provide the desired compressive strength, density, cost reduction, and/or reduced carbon footprint. In some embodiments, the perlite may be present in the settable compositions of the present invention in an amount in the range of from about 1% to about 75% by weight of cementitious components. Cementitious components include those components or combinations of components of the settable compositions that hydraulically set, or otherwise harden, to develop compressive strength, including, for example, perlite, CKD, fly ash, pumicite, slag, lime, shale, and the like. For example, the perlite may be present in an amount ranging between any of and/or including any of about 5%, about 10%, about 15%, about 20%, about 25%, about 30%, about 35%, about 40%, about 45%, about 50%, about 55%, about 60%, about 65%, or about 70%. In specific embodiments, the perlite may be present in the settable compositions in an amount in the range of from about 5% to about 50% by weight of cementitious components. In another embodiment, the perlite may be present in an amount in the range of from about 10% to about 40% by weight of cementitious components. In yet another embodiment, the perlite may be present in an amount in the range of from about 20% to about 30% by weight of cementitious components. One of ordinary skill in the art, with the benefit of this disclosure, will recognize the appropriate amount of perlite to include for a chosen application.

In one particular embodiment, the perlite can be interground with hydraulic cement. In one embodiment, the hydraulic cement may be a Portland cement, such as those classified as ASTM Type V cement. In another embodiment, the perlite can be interground with hydraulic cement and pumicite. In another embodiment, the perlite can be interground with hydraulic cement and CKD. The term "interground" or "intergrinding" as used herein means using a grinder (e.g., ball mill, rod mill, etc.) to reduce the particle size of the specified components. It is believed that intergrinding the perlite and hydraulic cement may improve the properties of the subsequent settable composition. For example, it is believed that intergrinding the perlite and hydraulic cement may provide accelerated strength development, in the subsequent settable compositions, as compared to intergrinding pumicite and hydraulic cement. By way of further example, it is believed that intergrinding the perlite and hydraulic cement may provide increased strength properties of the subsequent settable compositions, as compared to blending separately ground material.

In some embodiments, the interground perlite and hydraulic cement may comprise perlite in an amount of about 0.1% to about 99% by weight of the interground perlite and hydraulic cement and hydraulic cement in an amount of about 0.1% to about 99% by weight of the interground perlite and hydraulic cement. For example, the perlite may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of the interground perlite and hydraulic cement. By way of further example, the hydraulic cement may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of the interground perlite and hydraulic cement.

In accordance with embodiments, the hydraulic cement and perlite may be combined and ground to any size suitable for use in cementing operations. In another embodiment, the hydraulic cement and/or perlite may be ground prior to combination. In yet another embodiment, the perlite may be ground to a first particle size and then interground with the hydraulic cement to a second particle size. In an embodiment, the interground perlite and hydraulic cement has a mean particle size of about 0.1 microns to about 400 microns, including an amount ranging between any of and/or including any of about 0.5 microns, about 1 micron, about 2 microns, about 5 microns, about 10 microns, about 25 microns, about 50 microns, about 75 microns, about 100 microns, about 150 microns, about 200 microns, about 250 microns, about 300 microns, or about 350 microns. For example, the interground perlite and hydraulic cement may have a mean particle size of about 0.5 microns to about 50 microns. By way of further example, the interground perlite and hydraulic cement may have a mean particle size of about 0.5 microns to about 10 microns. The mean particle size corresponds to d50 values as measured by commercially available particle size analyzers such as those manufactured by Malvern Instruments, Worcestershire, United Kingdom. In some embodiments, the interground perlite and hydraulic cement may have a bimodal particle size distribution. For example, the interground perlite and hydraulic cement may have a bimodal particle size distribution with a first peak from about 1 microns to about 7 microns and a second peak from about 7 microns to about 15 microns, alternatively, a first peak from about 3 microns to about 5 microns and a second peak from about 9 microns to about 11 microns, and alternatively, a first peak of about 4 microns and a second peak of about 10 microns.

In some embodiments, the interground perlite and hydraulic cement may be present in an amount in the range of from about 0.1% to about 100% by weight of cementitious components in the settable composition. For example, the interground perlite and hydraulic cement may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of cementitious components. One of ordinary skill in the art, with the benefit of this disclosure, will recognize the appropriate amount of the interground perlite and hydraulic cement to include for a chosen application.

Embodiments of the settable compositions further may comprise hydraulic cement. As previously mentioned, the hydraulic cement may be interground with the perlite in accordance with certain embodiments. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica/lime cements and combinations thereof. In certain embodiments, the hydraulic cement may comprise a Portland cement. The Portland cements that may be suited for use in embodiments of the present invention are classified as Class A, C, H and G cements according to American Petroleum Institute, *Recommended Practice for Testing Well Cements*, API Specification 10B-2 (ISO 10426-2), First edition, July 2005. In addition, in some embodiments, cements suitable for use in the present invention may include cements classified as ASTM Type I, II, III, IV, or V.

The hydraulic cement may be included in the settable compositions in an amount sufficient for a particular application. In some embodiments, the hydraulic cement may be present in the settable compositions in an amount in the range of from about 0.1% to about 99% by weight of cementitious components. For example, the hydraulic cement may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of cementitious components. One of ordinary skill in the art, with the benefit of this disclosure, will recognize the appropriate amount of the hydraulic cement to include for a chosen application.

Embodiments of the settable compositions generally further may comprise CKD. It should be understood that embodiments of the present invention also may encompass intergrinding the CKD with the perlite and the hydraulic cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, $CaO$, $MgO$, $SO_3$, $Na_2O$, and $K_2O$.

The CKD generally may exhibit cementitious properties, in that it may set and harden in the presence of water. In accordance with embodiments of the present invention, the CKD may be used, among other things, to replace higher cost cementitious components, such as Portland cement, resulting in more economical settable compositions. In addition, substitution of the Portland cement for the CKD can result in a settable composition with a reduced carbon footprint.

The CKD may be included in the settable compositions in an amount sufficient to provide the desired compressive strength, density, cost reduction, and/or reduced carbon footprint. In some embodiments, the CKD may be present in the settable compositions of the present invention in an amount in the range of from about 1% to about 95% by weight of cementitious components. For example, the CKD may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, or about 90%. In specific embodiments, the CKD may be present in the settable compositions in an amount in the range of from about 5% to about 95% by weight of cementitious components. In another embodiment, the CKD may be present in an amount in the range of from about 50% to about 90% by weight of cementitious components. In yet another embodiment, the CKD may be present in an amount in the range of from about 60% to about 80% by weight of cementitious components. One of ordinary skill in the art, with the benefit of this disclosure, will recognize the appropriate amount of CKD to include for a chosen application.

Embodiments of the settable compositions further may comprise pumicite. It should be understood that embodiments of the present invention also may encompass intergrinding the pumicite with the perlite and the hydraulic cement. Generally, pumicite is a volcanic rock that exhibits cementitious properties, in that it may set and harden in the presence of hydrated lime and water. Hydrated lime may be used in combination with the pumicite, for example, to provide sufficient calcium ions for the pumicite to set. In accordance with embodiments of the present invention, the pumicite may be used, among other things, to replace higher cost cementitious components, such as Portland cement, resulting in more economical settable compositions. As previously mentioned, replacement of the Portland cement should also result in a settable composition with a reduced carbon footprint.

Where present, the pumicite may be included in an amount sufficient to provide the desired compressive strength, density, cost reduction and/or reduced carbon footprint for a particular application. In some embodiments, the pumicite may be present in the settable compositions of the present invention in an amount in the range of from about 1% to about 95% by weight of cementitious components. For example, the pumicite may be present in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, or about 90% by weight of cementitious components. In specific embodiments, the pumicite may be present in the settable compositions of the present invention in an amount in the range of from about 5% to about 95% by weight of cementitious components. In another embodiment, the pumicite may be present in an amount in the range of from about 5% to about 80% by weight of cementitious components. In yet another embodiment, the pumicite may be present in an amount in the range of from about 10% to about 50% by weight of cementitious components. In yet another embodiment, the pumicite may be present in an amount in the range of from about 25% to about 50% by weight of cementitious components. One of ordinary skill in the art, with the benefit of this disclosure, will recognize the appropriate amount of the pumicite to include for a chosen application.

Embodiments of the settable compositions further may comprise lime. In certain embodiments, the lime may be hydrated lime. The lime may be included in embodiments of the settable compositions, for example, to form a hydraulic composition with other components of the settable compositions, such as the pumicite, fly ash, slag, and/or shale. Where present, the lime may be included in the settable compositions in an amount sufficient for a particular application. In some embodiments, the lime may be present in an amount in the range of from about 1% to about 40% by weight of cementitious components. For example, the lime may be present in an amount ranging between any of and/or including any of about 5%, about 10%, about 15%, about 20%, about 25%, about 30%, or about 35%. In specific embodiments, the lime may be present in an amount in the range of from about 5% to about 20% by weight of cementitious components. One of ordinary skill in the art, with the benefit of this disclosure, will recognize the appropriate amount of the lime to include for a chosen application.

In accordance with certain embodiments, a mixture of pumicite and hydraulic cement, such as Portland cement may be included in the settable composition. In an embodiment, the cement/pumicite mixture contains hydraulic cement in an amount of about 25% to about 75% by weight of the mixture and pumicite in an amount of about 25% to about 75% by weight of the mixture. In an embodiment, the cement/pumicite mixture contains about 40% hydraulic cement by weight and about 60% pumicite by weight. In an embodiment, the cement/pumicite mixture may comprise hydraulic cement interground with pumicite. In one embodiment, the hydraulic cement may comprise Portland cement classified as ASTM Type V cement. In accordance with embodiments, the Portland cement and pumicite may be combined and ground to any size suitable for use in cementing operations. In another embodiment, the Portland cement and pumicite may be ground prior to combination. In an embodiment, the cement/pumicite mixture of Portland cement and pumicite has a mean particle size of about 0.1 microns to about 400 microns, alternatively, about 0.5 microns to about 50 microns, and alternatively, about 0.5 microns to about 10 microns. The mean particle size corresponds to d50 values as measured by commercially available particle size analyzers such as those manufactured by Malvern Instruments, Worcestershire, United Kingdom. An example of a suitable cement/pumicite mixture is available from Halliburton Energy Services, Inc., under the trade name FineCem™ 925 cement.

It is believed that hydraulic cement interground with pumicite when used in a settable composition in combination with unexpanded perlite may provide synergistic effects. For example, it is believed that the combination of unexpanded perlite and the cement/pumicite mixture may provide significantly higher compressive strength, particularly at elevated well bore temperatures. Accordingly, the combination of unexpanded perlite and the cement/pumicite mixture may be particularly suited for use in settable compositions at elevated well bore temperatures, such as at temperatures greater than about 80° F., alternatively greater than about 120° F., and alternatively greater than about 140° F.

Embodiments of the settable compositions further may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it should set to form a hardened mass. Class F fly ash generally does not contain sufficient lime, so an additional source of calcium ions is typically required for the Class F fly ash to form a hydraulic composition. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc.

Where present, the fly ash generally may be included in the settable compositions in an amount sufficient to provide the desired compressive strength, density, and/or cost. In some embodiments, the fly ash may be present in the settable compositions of the present invention in an amount in the range of about 1% to about 75% by weight of cementitious components. For example, the fly ash may be present in an amount ranging between any of and/or including any of about 5%, about 10%, about 20%, about 30%, about 40%, about 50%, about 60%, or about 70% by weight of cementitious components. In specific embodiments, the fly ash may be present in an amount in the range of about 10% to about 60% by weight of cementitious components. One of ordinary skill in the art, with the benefit of this disclosure, will recognize the appropriate amount of the fly ash to include for a chosen application.

Embodiments of the settable compositions further may comprise slag cement. In some embodiments, a slag cement that may be suitable for use may comprise slag. Slag generally does not contain sufficient basic material, so slag cement further may comprise a base to produce a hydraulic composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of about 1% to about 75% by weight of cementitious components. For example, the slag cement may be present in an amount ranging between any of and/or including any of about 5%, about 10%, about 20%, about 30%, about 40%, about 50%, about 60%, or about 70% by weight of cementitious components. In specific embodiments, the slag cement may be present in an amount in the range of about 5% to about 50% by weight of cementitious components. One of ordinary skill in the art, with the benefit of this disclosure, will recognize the appropriate amount of the slag cement to include for a chosen application.

Embodiments of the settable compositions further may comprise metakaolin. Generally, metakaolin is a white pozzolan that may be prepared by heating kaolin clay, for example, to temperatures in the range of about 600° C. to about 800° C. In some embodiments, the metakaolin may be present in the settable compositions of the present invention in an amount in the range of about 1% to about 75% by weight of cementitious components. For example, the metakaolin may be present in an amount ranging between any of and/or including any of about 5%, about 10%, about 20%, about 30%, about 40%, about 50%, about 60%, or about 70% by weight of cementitious components. In specific embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Embodiments of the settable compositions further may comprise shale. Among other things, shale included in the settable compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from TXI Energy Services, Inc. Generally, the shale may have any particle size distribution as desired for a particular application. In certain embodiments, the shale may have a particle size distribution in the range of about 37 micrometers to about 4,750 micrometers.

Where present, the shale may be included in the settable compositions of the present invention in an amount sufficient to provide the desired compressive strength, density, and/or cost. In some embodiments, the shale may be present in the settable compositions of the present invention in an amount in the range of about 1% to about 75% by weight of cementitious components. For example, the shale may be present in an amount ranging between any of and/or including any of about 5%, about 10%, about 20%, about 30%, about 40%, about 50%, about 60%, or about 70% by weight of cementitious components. In specific embodiments, the shale may be present in an amount in the range of about 10% to about 35% by weight of cementitious components. One of ordinary skill in the art, with the benefit of this disclosure, will recognize the appropriate amount of the shale to include for a chosen application.

Embodiments of the settable compositions further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669. An example of a suitable source of zeolite is available from the C2C Zeolite Corporation of Calgary, Canada. In some embodiments, the zeolite may be present in the settable compositions of the present invention in an amount in the range of about 1% to about 65% by weight of cementitious components. For example, the zeolite may be present in an amount ranging between any of and/or including any of about 5%, about 10%, about 20%, about 30%, about 40%, about 50%, or about 60% by weight of cementitious components. In specific embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Embodiments of the settable compositions further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylated lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR®15, HR®25, HR®601, SCR™ 100, and SCR™ 500 retarders. Generally, where used, the set retarding additive may be included in the settable compositions of the present invention in an amount sufficient to provide the desired set retardation. In some embodiments, the set retarding additive may be present in the settable compositions of the present invention an amount in the range of about 0.1% to about 5% by weight of cementitious components, including an amount ranging between any of and/or including any of about 0.5%, about 1%, about 2%, about 3%, or about 4% by weight of cementitious components. One of ordinary skill in the art, with the benefit of this disclosure, will recognize the appropriate amount of the set retarding additive to include for a chosen application.

Embodiments of the settable compositions further may include water. The water that may be used in embodiments of the settable compositions include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% by weight of cementitious components. For example, the water may be present in an amount ranging between any of and/or including any of about 50%, about 75%, about 100%, about 125%, about 150%, or about 175% by weight of cementitious components. In specific embodiments, the water may be included in an amount in the range of about 40% to about 150% by weight of cementitious components. One of ordinary skill in the art, with the benefit of this disclosure, will recognize the appropriate amount of water to include for a chosen application.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, elastomers, elastomeric particles, resins, latex, combinations thereof, and the like. A person having ordinary skill in the art, with the benefit of this disclosure, will readily be able to determine the type and amount of additive useful for a particular application and desired result. Embodiments of the settable compositions may be foamed and/or extended as desired by those of ordinary skill in the art.

The settable compositions of the present invention should have a density suitable for a particular application as desired by those of ordinary skill in the art, with the benefit of this disclosure. In some embodiments, the settable compositions may have a density in the range of from about 8 pounds per gallon ("lb/gal") to about 16 lb/gal. In other embodiments, the settable compositions may be foamed to a density in the range of from about 8 lb/gal to about 13 lb/gal.

As will be appreciated by those of ordinary skill in the art, embodiments of the settable compositions may be used in a variety of subterranean applications, including primary and remedial cementing. The settable compositions of the present invention also may be used in surface applications, for example, construction cementing. Embodiments may include providing a settable composition and allowing the settable composition to set. In some embodiments, the settable composition may be allowed to set in a location that is above ground, for example, in construction cementing. In other embodiments, the settable composition may be introduced into a well bore and allowed to set. For example, the settable composition may be placed into a space between a subterranean formation and a conduit located in the well bore. Embodiments of the settable compositions may comprise, for example, water and one or more of perlite, CKD, or pumicite. Embodiments of the settable compositions may comprise, for example, perlite interground with hydraulic cement (e.g., Portland cement).

In primary cementing embodiments, for example, a settable composition may be introduced into a space between a subterranean formation and a conduit (e.g., pipe strings, liners) located in the well bore. The settable composition may be allowed to set to form an annular sheath of hardened cement in the space between the subterranean formation and the conduit. Among other things, the set settable composition may form a barrier, preventing the migration of fluids in the well bore. The set settable composition also may, for example, support the conduit in the well bore.

In remedial cementing embodiments, a settable composition may be used, for example, in squeeze-cementing operations or in the placement of cement plugs. By way of example, the settable composition may be placed in a well bore to plug a void or crack in the formation, in a gravel pack, in the conduit, in the cement sheath, and/or a microannulus between the cement sheath and the conduit.

To facilitate a better understanding of the present invention, the following examples of certain aspects of some embodiments are given. In no way should the following examples be read to limit, or define, the scope of the invention.

EXAMPLE 1

A series of samples were prepared and subjected to 24-hour crush strength tests in accordance with API Specification 10 to analyze force resistance properties of settable compositions that comprise unexpanded perlite. The sample compositions were allowed to cure in a water bath at the temperature indicated in the table below for twenty-four hours. Immediately after removal from the water bath, crush strengths were determined using a Tinius Olsen tester. The results of the crush strength tests are set forth in the table below.

Test Nos. 1-6 were performed on samples with a 14.2 ppg and containing water, Portland class H cement, ground unexpanded perlite, lime, and water, as indicated in the table below. The ground unexpanded perlite was IM-325 from Hess Pumice Products with a particle size of about 325 U.S. Standard Mesh.

Test Nos. 7-8 were performed on samples with a density of 14.2 ppg and containing water, Portland class H cement, pumicite, and lime, as indicated in the table below. The pumicite was about 200 U.S. Standard Mesh in size.

Test Nos. 9-14 were performed on samples with a density of 14.2 ppg and containing water, a ground cement/pumicite mixture (FineCem™ 925 cement), unexpanded perlite, lime, and water, as indicated in the table below. The ground cement/pumicite mixture comprised Portland Type V cement (about 40% by weight) interground with pumicite (about 60% by weight). The ground cement/pumicite mixture had a mean particle size in the range of about 1 to about 4 microns. The ground unexpanded perlite was IM-325 from Hess Pumice Products with a particle size of about 325 U.S. Standard Mesh.

In the following table, percent by weight is based on the weight of the Portland cement, cement/pumicite mixture, pumicite, and unexpanded perlite in the sample, and gallons per sack (gal/sk) is based on a 94-pound sack of the Portland cement, cement/pumicite mixture, pumicite, and unexpanded perlite.

TABLE 1

Crush Strength Tests

| Test No. | Water (gal/sk) | Portland Cement (% by wt) | Ground Pumicite/Cement Mixture (% by wt) | Pumicite (% by wt) | Ground Unexpanded Perlite (% by wt) | Lime (% by wt) | Temp. (° F.) | 24-Hr Crush Strength (psi) |
|---|---|---|---|---|---|---|---|---|
| 1 | 7.44 | 100 | — | — | — | — | 80 | 330 |
| 2 | 7.44 | 100 | — | — | — | — | 140 | 674 |
| 3 | 6.74 | 75 | — | — | 25 | — | 80 | 290 |
| 4 | 6.74 | 75 | — | — | 25 | — | 140 | 777 |
| 5 | 6.95 | 75 | — | — | 25 | 5 | 80 | 352 |
| 6 | 6.95 | 75 | — | — | 25 | 5 | 140 | 886 |
| 7 | 6.74 | 75 | — | 25 | — | — | 140 | 835 |
| 8 | 6.95 | 75 | — | 25 | — | 5 | 140 | 734 |
| 9 | 6.03 | — | 100 | — | — | — | 80 | 827 |
| 10 | 6.03 | — | 100 | — | — | — | 140 | 1877 |
| 11 | 5.68 | — | 75 | — | 25 | — | 80 | 597 |
| 12 | 5.68 | — | 75 | — | 25 | — | 140 | 2740 |
| 13 | 5.89 | — | 75 | — | 25 | 5 | 80 | 530 |
| 14 | 5.89 | — | 75 | — | 25 | 5 | 140 | 2610 |

Example 1 thus indicates that replacement of at least a portion of the Portland cement with unexpanded perlite may increase the crush strength of the settable compositions. At 140° F., for example, the Test Nos. 2 and 4 with unexpanded perlite had crush strengths of 886 psi and 777 psi as compared to a crush strength of 674 psi for Test No. 1 with 100% Portland cement by weight.

Example 1 further indicates that the ground pumicite/cement mixture in combination with the unexpanded perlite may have synergistic effects on the settable composition, in that this combination may provide increased crush strengths at elevated temperatures. At 140° F., for example, Test Nos. 12 and 14 with the ground pumicite/cement mixture and unexpanded perlite had crush strengths of 2740 psi and 2610 psi. This crush strength is markedly higher than the crush strengths for compositions with 100% Portland cement (674 psi at 140° F.) and compositions with Portland cement and pumicite that were not ground to fine particle sizes (835 psi and 734 psi at 140° F.). This increased compressive strength for combinations of ground pumicite/cement mixture and unexpanded perlite cannot be attributed solely to the addition of expanded perlite as the combination had significantly higher crush strength than seen with addition of unexpanded perlite to Portland cement (777 psi and 886 psi at 140° F.). In addition, this increased compressive strength for combinations of ground pumicite/cement mixture and unexpanded perlite cannot be attributed solely to the addition of expanded perlite as the combination had significantly higher crush strength than seen with the ground pumicite/cement mixture alone (1877 at 140° F.).

EXAMPLE 2

An additional series of sample settable compositions were prepared and tested to analyze the force resistance properties of settable compositions that comprise CKD and unexpanded perlite. The sample compositions were allowed to cure in a water bath at the temperature indicated in the table below for either 24 or 72 hours. Immediately after removal from the water bath, crush strengths were determined using a Tinius Olsen tester. The results of the crush strength tests are set forth in the table below.

Test Nos. 15-28 were performed on samples with a density of 14.2 ppg and containing water, CKD, ground unexpanded perlite, and lime, as indicated in the table below. The samples further contained a cement set retarder (CFR-3™ cement set retarder, Halliburton Energy Services, Inc.) in an amount of about 0.4% by weight. The ground unexpanded perlite was IM-325 from Hess Pumice Products with a particle size of about 325 U.S. Standard Mesh.

In the following table, percent by weight is based on the weight of the CKD and unexpanded perlite in the sample, and gallons per sack (gal/sk) is based on a 94-pound sack of the CKD and unexpanded perlite.

TABLE 2

Crush Strength Tests

| Test No. | Water (gal/sk) | CKD (% by wt) | Ground Unexpanded Perlite (% by wt) | Lime (% by wt) | Temp. (° F.) | Time (Hr) | Crush Strength (psi) |
|---|---|---|---|---|---|---|---|
| 15 | 5.99 | 100 | — | — | 80 | 24 | 21.7 |
| 16 | 5.99 | 100 | — | — | 140 | 24 | 267 |
| 17 | 6.19 | 100 | — | 5 | 80 | 72 | 173 |
| 18 | 6.19 | 100 | — | 5 | 140 | 72 | 457 |
| 19 | 5.65 | 75 | 25 | — | 80 | 24 | 23.8 |
| 20 | 5.65 | 75 | 25 | — | 140 | 24 | 969 |
| 21 | 5.87 | 75 | 25 | 5 | 80 | 24 | 19.6 |
| 22 | 5.87 | 75 | 25 | 5 | 140 | 24 | 1004 |
| 23 | 5.5 | 50 | 50 | 5 | 80 | 72 | 124 |
| 24 | 5.5 | 50 | 50 | 5 | 140 | 72 | 1191 |
| 25 | 5.15 | 25 | 75 | 5 | 80 | 72 | 52 |
| 26 | 5.15 | 25 | 75 | 5 | 140 | 72 | 613 |
| 27 | 4.81 | — | 100 | 5 | 80 | 72 | 14 |
| 28 | 4.81 | — | 100 | 5 | 140 | 72 | 145 |

Example 2 thus indicates that unexpanded perlite may be used to enhance the crush strength of CKD-containing compositions. In addition, this effect is particularly pronounced at increased temperatures. At 140° F., for example, Test No. 22 with 75% CKD and 25% unexpanded perlite had a 72-hour crush strength of 1004 psi as compared to a 72-hour crush strength of 457 psi for Test No. 18 with 100% CKD.

EXAMPLE 3

An additional series of sample settable compositions were prepared and tested to further analyze the force resistance properties of settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test Nos. 29-37 were performed on samples with a density of 14.2 ppg and containing water, CKD, ground unexpanded perlite, and lime, as indicated in the table below. The samples further contained a cement dispersant in an amount of about 0.4% by weight. The ground unexpanded perlite was IM-325 from Hess Pumice Products with a particle size of about 325 U.S. Standard Mesh.

In the following table, percent by weight is based on the weight of the CKD and unexpanded perlite in the sample, and gallons per sack (gal/sk) is based on a 94-pound sack of the CKD and unexpanded perlite.

TABLE 3

Crush Strength Tests

| Test No. | Water (gal/sk) | CKD (% by wt) | Ground Unexpanded Perlite (% by wt) | Lime (% by wt) | Temp. (° F.) | 24-Hr Crush Strength (psi) |
|---|---|---|---|---|---|---|
| 29 | 6.19 | 100 | — | 5 | 140 | 278 |
| 30 | 5.48 | 90 | 10 | — | 140 | 649 |
| 31 | 6.05 | 90 | 10 | 5 | 140 | 533 |
| 32 | 5.7 | 80 | 20 | — | 140 | 934 |
| 33 | 5.92 | 80 | 20 | 5 | 140 | 958 |
| 34 | 5.42 | 60 | 40 | — | 140 | 986 |
| 35 | 5.64 | 60 | 40 | 5 | 140 | 1241 |
| 36 | 5.28 | 50 | 50 | — | 140 | 897 |
| 37 | 5.5 | 50 | 50 | 5 | 140 | 1197 |

Example 3 thus indicates that unexpanded perlite may be used to enhance the crush strength of CKD-containing compositions. For example, as indicated in the table above, the crush strength of the samples steadily increased as the concentration of unexpanded perlite in the sample was increased from 0% by weight to 40% by weight.

EXAMPLE 4

An additional series of sample settable compositions were prepared and tested to further analyze the force resistance properties of settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test Nos. 38-43 were performed on samples with a density of 14.2 ppg and containing water, CKD, perlite, and lime, as indicated in the table below. The samples further contained a cement dispersant in an amount of about 0.4% by weight. Test Nos. 38 and 39 contained a ground unexpanded perlite (IM-325) from Hess Pumice Products with a particle size of about 325 U.S. Standard Mesh. Test Nos. 40 and 41 contained unground perlite ore having a mean particle size (d50) of about 190 microns. Test Nos. 42 and 43 contained expanded perlite.

In the following table, percent by weight is based on the weight of the CKD and perlite in the sample, and gallons per sack (gal/sk) is based on a 94-pound sack of the CKD and perlite.

TABLE 4

Crush Strength Tests

| Test No. | Water (gal/sk) | CKD (% by wt) | Ground Unexpanded Perlite (% by wt) | Perlite Ore (% by wt) | Expanded Perlite (% by wt) | Lime (% by wt) | Temp. (° F.) | 24-Hr Crush Strength (psi) |
|---|---|---|---|---|---|---|---|---|
| 38 | 5.65 | 75 | 25 | — | — | — | 140 | 969 |
| 39 | 5.87 | 75 | 25 | — | — | 5 | 140 | 1004 |
| 40 | 5.63 | 75 | — | 25 | — | — | 140 | 199 |
| 41 | 5.85 | 75 | — | 25 | — | 5 | 140 | 204 |
| 42 | 1.07 | 75 | — | — | 25 | — | 140 | Not mixable |
| 43 | 1.29 | 75 | — | — | 25 | 5 | 140 | Not mixable |

Example 4 thus indicates that unexpanded perlite provides superior strength enhancement to CKD-containing compositions when compared to unground perlite ore and expanded perlite. Indeed, the sample with the expanded perlite could not even be tested due to mixability problems.

EXAMPLE 5

An additional series of sample settable compositions were prepared and tested to further analyze settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below. The thickening time for each sample was also determined at 140° F. in accordance with API Specification 10.

Test Nos. 44-56 were performed on samples with a density of 12.5 ppg and containing CKD, perlite, and lime, as indicated in the table below. The samples further contained a cement dispersant in an amount of about 0.4% by weight and a cement set retarder (HR® 5 cement retarder, Halliburton Energy Services, Inc.). Test Nos. 45, 48, 51, and 54 contained a ground unexpanded perlite (IM-325) from Hess Pumice Products with a particle size of about 314 U.S. Standard Mesh. Test Nos. 46, 49, 52, and 55 contained unground perlite ore having a mean particle size (d50) of about 190. Test Nos. 47, 50, 53, and 56 contained expanded perlite.

In the following table, percent by weight is based on the weight of the CKD and perlite in the sample, and gallons per sack (gal/sk) is based on a 94-pound sack of the CKD and perlite.

TABLE 5

Crush Strength and Thickening Time Tests

| Test No. | Water (gal/sk) | CKD (% by wt) | Ground Unexpanded Perlite (% by wt) | Perlite Ore (% by wt) | Expanded Perlite (% by wt) | Lime (% by wt) | Set Retarder (% by wt) | Temp. (° F.) | Thick. Time to 70 Bc (psi) | 24-Hr Crush Strength (psi) |
|---|---|---|---|---|---|---|---|---|---|---|
| 44 | 10.51 | 100 | — | — | — | 5 | 0.3 | 140 | 4:06 | 126 |
| 45 | 10.34 | 90 | 10 | — | — | 5 | 0.3 | 140 | 4:17 | 178.2 |
| 46 | 10.36 | 90 | — | 10 | — | 5 | 0.3 | 140 | 5:16 | 119 |
| 47 | | 90 | — | — | 10 | 5 | 0.6 | 140 | Mixable not pumpable | |
| 48 | 10.18 | 80 | 20 | — | — | 5 | 0.3 | 140 | 4:20 | 311 |
| 49 | 10.18 | 80 | — | 20 | — | 5 | 0.3 | 140 | 5:49 | 100 |
| 50 | | 80 | — | — | 20 | 5 | 0.3 | 140 | Not mixable | |
| 51 | 9.84 | 60 | 40 | — | — | 5 | 0.3 | 140 | 5:05 | 508 |
| 52 | | 60 | — | 40 | — | 5 | 0.15 | 140 | 9:44 | 88 |
| 53 | | 60 | — | — | 40 | 5 | 0.3 | 140 | Not mixable | |

TABLE 5-continued

| | | | | | | | Set | | Thick. | 24-Hr |
| | | | Ground | Perlite | | | Retarder | | Time | Crush |
| | | CKD | Unexpanded | Ore | Expanded | Lime | (% by | | to 70 Bc | Strength |
| Test | Water | (% by | Perlite | (% by | Perlite | (% by | wt) | Temp. | (psi) | (psi) |
| No. | (gal/sk) | wt) | (% by wt) | wt) | (% by wt) | wt) | | (° F.) | | |
| --- | --- | --- | --- | --- | --- | --- | --- | --- | --- | --- |
| 54 | 9.67 | 50 | 50 | — | — | 5 | 0.3 | 140 | 8:04 | 616 |
| 55 | | 50 | — | 50 | — | 5 | 0 | 140 | 23:30 | 78 |
| 56 | | 50 | — | — | 50 | 5 | 0.3 | 140 | Not mixable | |

Example 5 thus indicates that unexpanded perlite provides enhanced strength to CKD-containing compositions when compared to unground perlite ore and expanded perlite. In a similar manner to the preceding example, the samples with expanded perlite could not even be tested due to mixability problems.

EXAMPLE 6

An additional series of sample settable compositions were prepared and tested to further analyze settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test No. 57 was performed on a sample with a density of 12.5 ppg and containing water, Portland Type V cement, CKD, unground perlite ore, and pumicite, as indicated in the table below. The unground perlite ore had a mean particle size (d50) of about 190. The pumicite had a mean particle size (d50) of about 4 microns.

Test No. 58 was performed on a sample with a density of 12.5 ppg and containing water, ground cement/pumicite mixture pumicite, CKD, and ground unexpanded perlite. The ground cement/pumicite mixture comprised Portland Type V cement (about 40% by weight) interground with pumicite (about 60% by weight). The ground cement/pumicite mixture had a mean particle size of about 1-4 microns. The ground unexpanded perlite was IM-325 from Hess Pumice Products with a particle size of about 325 U.S. Standard Mesh.

In the following table, percent by weight is based on the weight of the CKD, cement, perlite, pumicite, and/or pumicite/cement mixture in the sample, and gallons per sack (gal/sk) is based on a 94-pound sack of the CKD, cement, perlite, pumicite, and/or pumicite/cement mixture in the sample.

Example 6 thus indicates that unexpanded perlite in combination with ground pumicite provides enhanced strength to CKD-containing compositions in comparison to compositions with standard cement, pumicite, and unground perlite ore.

EXAMPLE 7

An additional series of sample settable compositions were prepared and tested to analyze settable compositions that comprised interground perlite and hydraulic cement.

The sample settable compositions were formed by mixing the components in the amounts set forth in the table below. The interground pumicite and cement comprised pumicite (about 60% by weight) and Portland Type V cement (about 40% by weight) and had a mean particle size of about 1-4 microns. The interground pumicite and cement are available from Halliburton Energy Services, Inc., under the trade name FineCem™ 925 cement. The interground perlite and cement comprised ground unexpanded perlite (about 60% by weight) and Portland Type V cement (about 40% by weight) and had a bimodal particle size distribution with peak particle sizes of about 4 microns and about 10 microns. The interground perlite and cement was obtained from Hess Pumice Products, Malad City, Id. The lime was hydrated lime, obtained from Univar USA.

The sample compositions were subjected to 24-hour crush strength tests in accordance with API Specification 10. The sample compositions were allowed to cure in a water bath at the temperature indicated in the table below for 24 hours. Immediately after removal from the water bath, crush strengths were determined using a Tinius Olsen tester.

The results of the crush strength tests are set forth in the table below.

TABLE 6

Crush Strength Tests

| | | Portland | | Ground Pumicite Cement | CKD | Ground Unexpanded | Perlite Ore | | 24-Hr Crush |
| | Water | Type V Cement | Pumicite | Mixture | (% by | Perlite | (% by | Temp. | Strength |
| Test No. | (gal/sk) | (% by wt) | (% by wt) | (% by wt) | wt) | (% by wt) | wt) | (° F.) | (psi) |
| --- | --- | --- | --- | --- | --- | --- | --- | --- | --- |
| 57 | 9.52 | 20 | 30 | — | 25 | — | 25 | 140 | 201 |
| 58 | 9.72 | — | — | 50 | 25 | 25 | — | 140 | 1086 |

TABLE 7

Crush Strength Tests

| Test No. | Density (lb/gal) | Water (% bwc[1]) | Interground Pumicite and Cement (% bwc) | Interground Perlite and Cement (% bwc) | Lime (% bwc) | Temp. (° F.) | 24-Hr Crush Strength (psi) |
|---|---|---|---|---|---|---|---|
| 59 | 14.2 | 52.46 | 100 | — | — | 140 | 2870 |
| 60[2] | 14.2 | 52.46 | — | 100 | — | 140 | 1998 |
| 61 | 12.5 | 92.49 | 100 | — | 5 | 140 | 1287 |
| 62 | 12.5 | 92.49 | — | 100 | 5 | 140 | 1489 |
| 63 | 12.5 | 88.9 | 50 | 50 | — | 140 | 1081 |
| 64 | 12.5 | 92.49 | 50 | 50 | 5 | 140 | 1023 |
| 65 | 11 | 159.58 | 100 | — | — | 140 | 311 |
| 66 | 11 | 159.58 | — | 100 | — | 140 | 408 |
| 67 | 10.5 | 204.84 | 100 | — | — | 140 | 105.9 |
| 68 | 10.5 | 204.84 | — | 100 | — | 140 | 185.1 |

[1]The term "% bwc" refers to by weight of cement, which in this example is either by weight of the interground pumicite and cement or by weight of the interground perlite and cement.
[2]1.2 grams of CFR-3™ friction reducer were added to the sample settable composition for Test No. 60.

Example 7 thus indicates that interground perlite and hydraulic cement generally provides enhances compressive strength development as compared to interground pumicite and hydraulic cement. It should be noted that the CFR-3™ included in Test No. 60 retarded the setting resulting in the lower 24-hour crush strength as compared to Test No. 59 with the interground pumicite and cement.

EXAMPLE 8

An additional series of sample settable compositions were prepared and tested to further analyze settable compositions that comprised interground perlite and hydraulic cement.

The sample settable compositions were formed by mixing the components in the amounts set forth in the table below. The interground pumicite and cement comprised pumicite (about 60% by weight) and Portland Type V cement (about 40% by weight) and had a mean particle size of about 1-4 microns. The interground pumicite and cement are available from Halliburton Energy Services, Inc., under the trade name FineCem™ 925 cement. The interground perlite and cement comprised ground unexpanded perlite (about 60% by weight) and Portland Type V cement (about 40% by weight) and had a bimodal particle size distribution with peak particle sizes of about 4 microns and about 10 microns. The interground perlite and cement was obtained from Hess Pumice Products, Malad City, Id.

The sample compositions were subjected to 24-hour crush strength tests in accordance with API Specification 10. The sample compositions were allowed to cure in a water bath at the temperature indicated in the table below for 24 hours. Immediately after removal from the water bath, crush strengths were determined using a Tinius Olsen tester. The thickening time for each sample was also determined at 140° F. in accordance with API Specification 10.

The results of the crush strength and thickening time tests are set forth in the table below.

TABLE 8

Crush Strength and Thickening Time Tests

| Test No. | Density (lb/gal) | Water (% bwc[1]) | Interground Pumicite and Cement (% bwc) | Interground Perlite and Cement (% bwc) | Retarder (% bwc) | Temp. (° F.) | Thick. Time to 70 Bc[2] (hr:min) | 24-Hr Crush Strength (psi) |
|---|---|---|---|---|---|---|---|---|
| 69 | 12.5 | 88.85 | 100 | — | 0.4 HR ®-5 | 140 | 8:56 | — |
| 70 | 12.5 | 88.87 | 100 | — | 0.25 HR ®-5 | 140 | 4:57 | — |
| 71 | 12.5 | 88.87 | — | 100 | 0.25 HR ®-5 | 140 | 3:54 | — |
| 72 | 12.5 | 89.0 | 100 | — | 0.25 HR ®-800 | 140 | 2:57 | — |
| 73 | 12.5 | 89.05 | 100 | — | 0.25 HR ®-800 | 140 | 4:11 | 919 |
| 74 | 12.5 | 89.05 | — | 100 | 0.25 HR ®-800 | 140 | 4:15 | 1178 |

[1]The abbreviation "% bwc" refers to by weight of cement, which in this example is either by weight of the interground pumicite and cement or by weight of the interground perlite and cement.
[2]The abbreviation "Bc" refers to Bearden units of consistency.

Example 8 thus indicates that settable compositions comprising interground perlite and hydraulic cement may have acceptable thickening times for use in subterranean applications. Example 8 further indicates that interground perlite and hydraulic cement generally provides enhanced compressive strength development and can be similarly controlled with retarders as compared to interground pumicite and hydraulic cement.

EXAMPLE 9

An additional series of sample settable compositions were prepared and tested to further analyze settable compositions that comprised interground perlite and hydraulic cement.

The sample settable compositions were formed by mixing the components in the amounts set forth in the table below.

The interground pumicite and cement comprised pumicite (about 60% by weight) and Portland Type V cement (about 40% by weight) and had a mean particle size of about 1-4 microns. The interground pumicite and cement are available from Halliburton Energy Services, Inc., under the trade name FineCem™ 925 cement. The interground perlite and cement comprised ground unexpanded perlite (about 60% by weight) and Portland Type V cement (about 40% by weight) and had a bimodal particle size distribution with peak particle sizes of about 4 microns and about 10 microns. The interground perlite and cement was obtained from Hess Pumice Products, Malad City, Id.

Free water data was then gathered for each sample composition in accordance with API Specification 10. The free water data is set forth in the table below.

TABLE 9

Free Water Data

| Test No. | Density (lb/gal) | Water (% bwc[1]) | Interground Pumicite and Cement (% bwc) | Interground Perlite and Cement (% bwc) | Temp. (° F.) | Free Water (cc[2]) |
|---|---|---|---|---|---|---|
| 75 | 11 | 159.58 | 100 | — | 80 | 2 |
| 76 | 11 | 159.58 | — | 100 | 80 | 0 |
| 77 | 10.5 | 204.84 | 100 | — | 80 | 8 |
| 78 | 10.5 | 204.84 | — | 100 | 80 | 1 |
| 79 | 10.5 | 204.84 | 50 | 50 | 80 | 2 |
| 80 | 10 | 277.18 | 100 | — | 80 | 56 |
| 81 | 10 | 277.18 | — | 100 | 80 | 14 |

[1]The abbreviation "% bwc" refers to by weight of cement, which in this example is either by weight of the interground pumicite and cement or by weight of the interground perlite and cement.
[2]The abbreviation "cc" refers to cubic centimeters.

Example 9 thus indicates that settable compositions comprising interground perlite and hydraulic cement may have provide lower levels of free water as compared to interground pumicite and hydraulic cement.

It should be understood that the compositions and methods are described in terms of "comprising," "containing," or "including" various components or steps, the compositions and methods can also "consist essentially of" or "consist of" the various components and steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A method of cementing comprising:
   providing a settable composition comprising perlite, hydraulic cement, and water; wherein the water is present in an amount in a range between about 40% to about 200% by weight of cementitious components; wherein the perlite and hydraulic cement are interground prior to combination with the water to form the settable composition; and
   allowing the settable composition to set.

2. The method of claim 1 wherein the perlite comprises unexpanded perlite.

3. The method of claim 1 wherein the perlite and the hydraulic cement were interground to a mean particle about 0.1 microns to about 400 microns.

4. The method of claim 1 wherein the perlite and the hydraulic cement were interground to a mean particle about 0.5 microns to about 10 microns.

5. The method of claim 1 wherein the perlite is present in an amount of about 40% to about 80% by weight of the perlite and hydraulic cement, and wherein the hydraulic cement is present in an amount of about 20% to about 60% by weight of the perlite and hydraulic cement.

6. The method of claim 1 wherein the hydraulic cement comprises at least one cement selected from the group consisting of a Portland cement, a pozzolana cement, a gypsum cement, a high-alumina-content cement, a slag cement, a silica/lime cement, and any combination thereof.

7. The method of claim 1 wherein the hydraulic cement comprises a Portland cement.

8. The method of claim 1 wherein the perlite and the hydraulic cement were interground with at least one additional component selected from the group consisting of cement kiln dust and pumicite.

9. The method of claim 1 wherein the settable composition further comprises cement kiln dust.

10. The method of claim 1 wherein the settable composition further comprises pumicite.

11. The method of claim 1 wherein the settable composition further comprises at least one additive selected from the group consisting of lime, fly ash, slag cement, metakaolin, shale, zeolite, crystalline silica, amorphous silica, fumed silica, salt, fiber, hydratable clay, microsphere, rice husk ash, elastomer, elastomeric particle, resin, latex, and any combination thereof.

12. The method of claim 1 wherein the settable composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

13. The method of claim 1 further comprising introducing the settable composition into a well bore.

14. The method of claim 13 wherein the settable composition is allowed to set in the well bore in an annulus between a subterranean formation and a conduit in the well bore.

15. The method of claim 13 further comprising squeezing the settable composition in an opening, the opening comprising at least one opening selected from the group consisting of an opening in a subterranean formation, an opening in a gravel pack, an opening in a conduit, and a microannulus between a cement sheath and a conduit.

16. A method of cementing comprising:
providing a settable composition comprising unexpanded perlite, hydraulic cement, and water; wherein the water is present in an amount in a range between about 40% to about 200% by weight of cementitious components; wherein the unexpanded perlite and hydraulic cement are interground prior to combination with the water to foiiii the settable composition;
introducing the settable composition into a well bore; and allowing the settable composition to set.

17. The method of claim 16 wherein the perlite and hydraulic cement were interground to a mean particle about 0.5 microns to about 10 microns.

18. The method of claim 16 wherein the perlite is present in an amount of about 40% to about 80% by weight of the perlite and hydraulic cement, and wherein the hydraulic cement in an amount of about 20% to about 60% by weight of the perlite and hydraulic cement.

19. The method of claim 16 wherein the hydraulic cement comprises at least one cement selected from the group consisting of a Portland cement, a pozzolana cement, a gypsum cement, a high-alumina-content cement, a slag cement, a silica/lime cement, and any combination thereof.

20. The method of claim 16 wherein the hydraulic cement comprises a Portland cement.

21. The method of claim 16 wherein the perlite and the hydraulic cement were interground with at least one additional component selected from the group consisting of cement kiln dust and pumicite.

22. The method of claim 16 wherein the settable composition further comprises cement kiln dust.

23. The method of claim 16 wherein the settable composition further comprises pumicite.

24. The method of claim 16 wherein the settable composition further comprises at least one additive selected from the group consisting of lime, fly ash, slag cement, metakaolin, shale, zeolite, crystalline silica, amorphous silica, fumed silica, salt, fiber, hydratable clay, microsphere, rice husk ash, elastomer, elastomeric particle, resin, latex, and any combination thereof.

25. The method of claim 16 wherein the settable composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

26. The method of claim 16 wherein the settable composition is allowed to set in the well bore in an annulus between a subterranean formation and a conduit in the well bore.

27. The method of claim 16 further comprising squeezing the settable composition in an opening, the opening comprising at least one opening selected from the group consisting of an opening in a subterranean formation, an opening in a gravel pack, an opening in a conduit, and a microannulus between a cement sheath and a conduit.

* * * * *